(12) United States Patent
Terada et al.

(10) Patent No.: US 8,309,271 B2
(45) Date of Patent: Nov. 13, 2012

(54) TUBULAR FUEL CELL AND FUEL CELL MODULE

(75) Inventors: Masaki Terada, Toyota (JP); Yukihisa Katayama, Toyota (JP); Hirokazu Ishimaru, Toyota (JP); Yuichiro Hama, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 982 days.

(21) Appl. No.: 11/990,188

(22) PCT Filed: Aug. 3, 2006

(86) PCT No.: PCT/JP2006/315776
§ 371 (c)(1),
(2), (4) Date: Feb. 8, 2008

(87) PCT Pub. No.: WO2007/018249
PCT Pub. Date: Feb. 15, 2007

(65) Prior Publication Data
US 2010/0021789 A1 Jan. 28, 2010

(30) Foreign Application Priority Data
Aug. 10, 2005 (JP) .................................. 2005-231764

(51) Int. Cl.
*H01M 8/10* (2006.01)
*H01M 8/24* (2006.01)
*H01M 2/20* (2006.01)

(52) U.S. Cl. ......... 429/497; 429/466; 429/468; 429/469

(58) Field of Classification Search .................. 429/497, 429/466, 468, 469
See application file for complete search history.

(56) References Cited

U.S. PATENT DOCUMENTS

| 5,458,989 A | 10/1995 | Dodge |
| 5,827,620 A | 10/1998 | Kendall |
| 6,001,500 A | 12/1999 | Bass et al. |
| 6,007,932 A | 12/1999 | Steyn |
| 7,150,932 B1 | 12/2006 | Hofler et al. |
| 7,534,513 B2 | 5/2009 | Nakanishi et al. |
| 8,034,512 B2 * | 10/2011 | Hama et al. ............... 429/517 |
| 2003/0190514 A1 * | 10/2003 | Okada et al. ............... 429/31 |
| 2004/0062978 A1 * | 4/2004 | Yazici ......................... 429/38 |
| 2004/0247972 A1 * | 12/2004 | Kendall et al. ............. 429/31 |

(Continued)

FOREIGN PATENT DOCUMENTS

CA 2 466 262 5/2003

(Continued)

OTHER PUBLICATIONS

Definition of Coil: http://define.com/coil; May 13, 2011.*

(Continued)

*Primary Examiner* — Eugenia Wang
(74) *Attorney, Agent, or Firm* — Finnegan, Henderson, Farabow, Garrett & Dunner, LLP

(57) ABSTRACT

A tubular fuel cell comprises a cylindrical internal electrode having electrical conductivity, a lamination of a first catalytic layer, an electrolytic layer, and a second catalytic layer laminated in that order on an outer circumferential surface of the internal electrode, and an electrically conductive exterior coil wound around an outer circumferential surface of the second catalytic layer. The tubular fuel cell further comprises an electrically conductive spacer which has an outside diameter greater than that of the exterior coil.

9 Claims, 5 Drawing Sheets

U.S. PATENT DOCUMENTS

2005/0147857 A1  7/2005  Crumm et al.

FOREIGN PATENT DOCUMENTS

| DE | 199 09 930 A1 | 7/2000 |
|---|---|---|
| JP | 2-13258 | 1/1990 |
| JP | 5-101842 | 4/1993 |
| JP | 8-507896 | 8/1996 |
| JP | 10-134839 | 5/1998 |
| JP | 2000-58101 | 2/2000 |
| JP | 2002-298877 | 10/2002 |
| JP | 2005-135595 | 5/2005 |
| JP | 2005-353484 | 12/2005 |
| JP | 2006-216421 | 8/2006 |

OTHER PUBLICATIONS

International Search Report, (Feb. 1, 2007).
Notice of Grounds for Rejection for JP Appl. No. 2005-231764 mailed Jan. 25, 2011.
European Patent Office Action for EP Appl. No. 06 798 439.9-2119, dated Mar. 2, 2010.
Canadian Office Action dated May 26, 2010 for Canadian Appl. No. 2,612,510.
Notification of the First Office Action for Chinese Patent Applicatiojn No. 2006800282425, dated Jul. 24, 2009.
Canadian Office Action dated Sep. 17, 2009 for Canadian Application No. 2,612,510.

* cited by examiner

100

100

100

PRIOR ART

PRIOR ART

US 8,309,271 B2

TUBULAR FUEL CELL AND FUEL CELL MODULE

CROSS-REFERENCE TO PRIOR APPLICATION

This is the U.S. National Phase Application under 35 U.S.C. §371 of International Patent Application No. PCT/JP2006/315776, filed Aug. 3, 2006, which claims benefit of Japanese Patent Application No. 2005-231764, filed Aug. 10, 2005.

TECHNICAL FIELD

The present invention relates to a tubular fuel cell and a fuel cell module in which a current collecting electrode also functions as a spacer between fuel cells.

BACKGROUND ART

As shown in a cross sectional view of FIG. 8 taken along a tube drawing direction, a tubular fuel cell is conventionally configured to include an internal electrode 10, a first catalytic layer 12, an electrolytic layer 14, a second catalytic layer 16, an exterior coil 18, and a resin seal 20. FIG. 9 is a cross sectional view taken along a line A-A in FIG. 8. As shown in FIG. 9, the internal electrode 10, the first catalytic layer 12, the electrolytic layer 14, and the second catalytic layer 16 are sequentially laminated in that order from inside in the form of a substantially coaxial cylinder.

When a plurality of such tubular fuel cells are assembled and combined into a module, it is preferable that the cells be placed at predetermined intervals that will enable them to supply fuel gas or oxidant gas to the cells as uniformly as possible to ensure that heat resulting from the chemical reactions will be preferably removed. Japanese Patent Laid-Open Publication No. 2002-298877 discloses a spacer structure in a tubular fuel cell in which a gas sealing part is prevented from receiving a load, thereby enabling reduction in occurrence of a cell tube failure.

Conventional art, however, has required, in addition to spacers used for maintaining spacings between a plurality of tubular fuel cells at a predetermined distance, the current collecting wires be independently connected to establish parallel connection between internal electrodes and between exterior coils in the plurality of tubular fuel cells combined into the module. Such a system of connecting the current collecting wires is complicated, hampering production of inexpensive fuel cell modules. Further, there has been a necessity to provide electrodes for current collection in addition to the spacers, which obstructs efforts to miniaturize the fuel cell module.

In particular, when several to tens of thousands of ultra-thin tubular fuel cells measuring approximately several millimeters in diameter are assembled and combined into a module while securing a several millimeter cell spacing, electrical connection between the cells combined into the module should be established, which necessitates a highly accurate wiring technique and a great amount of time and effort. Accordingly, the resulting operation or process of manufacturing a fuel cell module is complicated and difficult, thereby increasing manufacturing costs.

DISCLOSURE OF THE INVENTION

The present invention advantageously provides a tubular fuel cell in which catalytic and electrolytic layers are laminated on an outer surface of a cylindrical internal electrode, the tubular fuel cell further comprising an electrically conductive spacer.

Specifically, the tubular fuel cell comprises a cylindrical internal electrode having electrical conductivity; a lamination of a first catalytic layer, an electrolytic layer, and a second catalytic layer sequentially laminated in that order on the outer surface of the internal electrode; an electrically conductive exterior coil wound around an outer circumferential surface of the second catalytic layer; and an electrically conductive spacer which has an outside diameter greater than that of the exterior coil. In other words, the spacer is installed such that the outside diameter of a non-power-generating section of the tubular fuel cell is larger than that of a power generating section of the tubular fuel cell.

When the spacer is used as a current collecting electrode to collect currents from the second catalytic layer, it is preferable that the spacer be electrically connected to the exterior coil.

A plurality of such tubular fuel cells can be assembled to thereby constitute a fuel cell module. Namely, the present invention also provides a fuel cell module having a plurality of tubular fuel cells in which the plurality of tubular fuel cells are arranged in such a way that outer circumferential surfaces of the spacers are brought into contact with each other.

Because conductivity is imparted to the spacer, when a plurality of tubular fuel cells are combined into a module, the spacer is capable of concurrently functioning to maintain a predetermined spacing between the tubular fuel cells and to provide electrical connection between the tubular fuel cells. Accordingly, inexpensive manufacturing of the fuel cell module can be realized.

For example, it is preferable that the spacer be a electrically conductive member formed in a shape of a cylindrical or polygonal column having a hollow part. Alternatively, the spacer may be composed of an electrically conductive coil which is wound so as to be larger in outside diameter than the exterior coil.

Alternatively, a part of the exterior coil may be wound so as to have an outside diameter larger than that of other parts of the exterior coil and may be used as a spacer, which can again contribute to simpler, less expensive manufacturing of the spacer.

BEST MODE FOR CARRYING OUT THE INVENTION

Preferred embodiments of the present invention will be described bellow.

Structure of Tubular Fuel Cell

Figure 1:
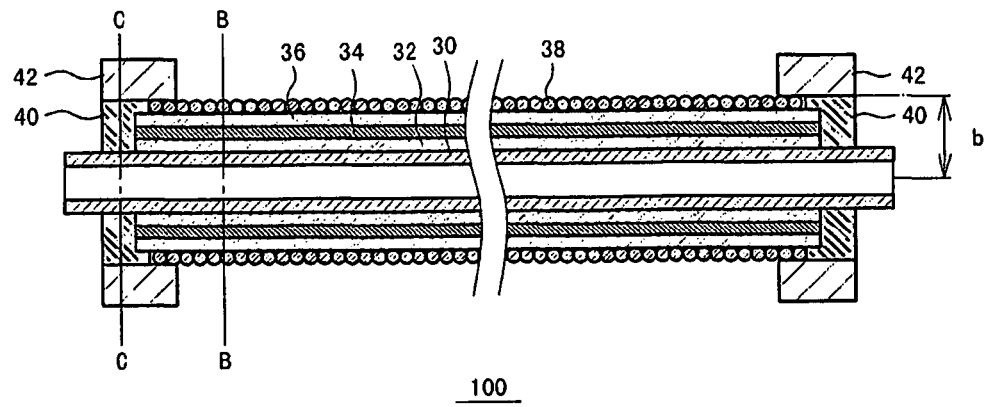
FIG. 1 shows, in a cross sectional view, a structure of a tubular fuel cell according to an embodiment of the present invention.
Figure 2:
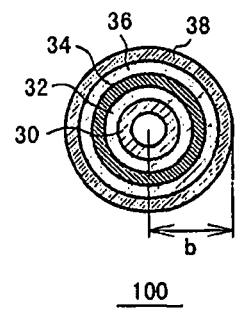
FIG. 2 is a cross sectional view taken along a line B-B in FIG. 1 showing the structure of the tubular fuel cell.
Figure 3:
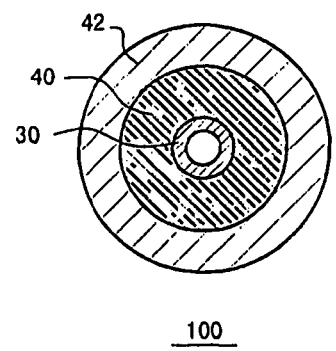
FIG. 3 is a cross sectional view taken along a line C-C in FIG. 1 showing the structure of the tubular fuel cell.
Figure 4A:
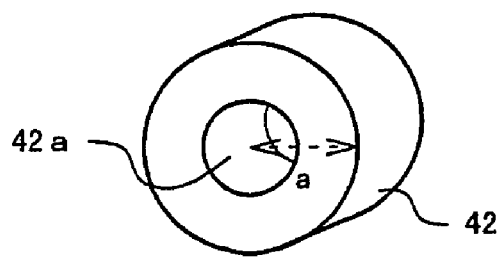
FIG. 4A is a perspective diagram showing an example of a spacer shape in the embodiment of the present invention.
Figure 4B:
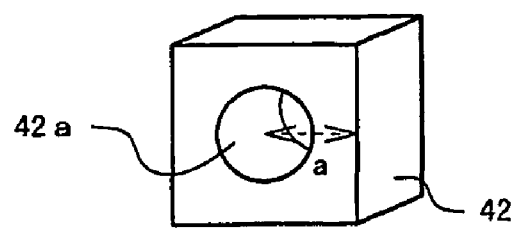
FIG. 4B is a perspective diagram showing another example of a spacer shape in the embodiment of the present invention.
Figure 4C:
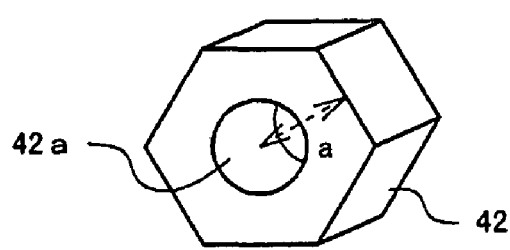
FIG. 4C is a perspective diagram showing still another example of a spacer shape in the embodiment of the present invention.
Figure 4D:
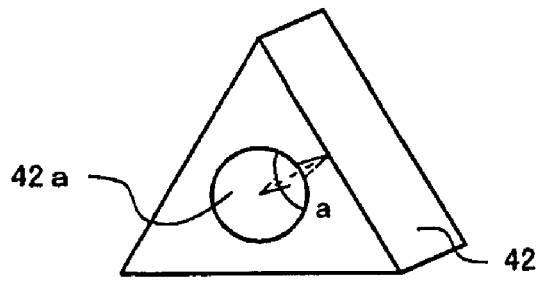
FIG. 4D is a perspective diagram showing a further example of a spacer shape in the embodiment of the present invention.

As shown in a cross sectional view taken along a tube drawing direction in FIG. 1, a tubular fuel cell 100 according to an embodiment of the present invention comprises an internal electrode 30, a first catalytic layer 32, an electrolytic layer 34, a second catalytic layer 36, an exterior coil 38, resin seals 40, and spacers 42. FIGS. 2 and 3 show cross sectional views of the tubular fuel cell 100 taken along lines B-B and C-C indicated in FIG. 1. As shown in FIGS. 2 and 3, the tubular fuel cell 100 is configured with the internal electrode 30, the first catalytic layer 32, the electrolytic layer 34, and the second catalytic layer 36 sequentially laminated from inside in the form of a substantially coaxial cylinder.

The internal electrode 30 is a cylindrical member composed of a material having high electrical conductivity, and placed at the center of the tubular fuel cell 100 as shown in the sectional views of FIGS. 1 to 3. The internal electrode 30 may be formed using a highly conductive material such as, for example, stainless steel, gold, silver, copper, aluminum, or the like. When a material such as stainless steel is used, the material is preferably coated with a superior corrosion-proof material, such as gold or silver, through electroplating or the like to enhance resistance to corrosion. An edge portion of the internal electrode 30 is connected to an electrode (not illustrated) to draw out electric power from the tubular fuel cell 100 to the outside. In addition; a circumferential wall other than the edge portion of the internal electrode 30 is perforated with a great number of pores to supply fuel gas (such as gas containing oxygen or gas containing organic hydrocarbon, for example) flowing through a hollow section of the internal electrode 30 to a direction toward the outer surface.

The first catalytic layer 32 corresponds to a fuel electrode. The first catalytic layer 32 may be formed as shown in the sectional views of FIGS. 1 and 2 which will be described in detail below. After dispersing carbon (C) particles which bear a catalytic metal, such as a noble metal, for example platinum (Pt) series, in an appropriate organic solvent, a proper amount of an electrolytic solution is added to the organic solvent having the carbon particles to obtain a mixture in the form of a paste. Then, the mixture in the form of a paste is coated on the outer surface of the internal electrode 30 except for the edge portions thereof, to thereby form the first catalytic layer 32. At this point, the first catalytic layer 32 is formed on neither of the edge portions of the internal electrode 30 in view of allowing both edge portions of the internal electrode 30, on which no pores are perforated, to protrude to the outside as shown in the sectional views of FIGS. 1 and 3. During operation of the fuel cell, fuel gas is fed through the hollow portion in the internal electrode 30 to the first catalytic layer 32.

The electrolytic layer 34 has a function of transporting protons generated at the fuel electrode to an air electrode. A material forming the electrolytic layer 34 is selected taking into account high conductivity and stability with respect to the protons. For example, a fluoropolymer having a sulfone group or a similar polymer may be coated on the outer circumferential surface of the first catalytic layer 32 as shown in the sectional views of FIGS. 1 and 2, to form the electrolytic layer 34.

The second catalytic layer 36 corresponds to the air electrode. The second catalytic layer 36 can be formed as shown in the sectional views of FIGS. 1 and 2, which will be described in detail below. After dispersing carbon (C) particles which bear a catalytic metal, such as a noble metal, for example platinum (Pt) series, in an appropriate organic solvent, a proper amount of an electrolytic solution is added to the organic solvent to obtain a mixture in the form of a paste. Then, the mixture in the form of a paste is coated on the outer circumferential surface of the internal electrode 30 other than the edge portion thereof, to thereby form the second catalytic layer 36. During operation of the fuel cell, oxidant gas (which is gas containing an oxygen, such as air, for example) is supplied to the second catalytic layer 36.

The exterior coil 38 is composed of a material having high electrical conductivity. The exterior coil 38 may be formed using, for example, a stainless, a gold, a silver, a copper, an aluminum, or the like being a highly conductive material. When a material, such as stainless steel, is used, the material is preferably coated with a superior corrosion-proof material, such as gold or silver, through electroplating to enhance resistance to corrosion.

As shown in the sectional views of FIGS. 1 and 2, the exterior coil 38 is helically wound over the first catalytic layer 32, the electrolytic layer 34, and the second catalytic layer 36, which are substantially coaxially laminated on the outer surface of the internal electrode 30. Specifically, the exterior coil 38 is wound around the outer circumferential surface of the second catalytic layer 36 so as to be electrically conductive to the second catalytic layer 36. To enhance conductivity between the exterior coil 38 and the second catalytic layer 36, it is preferable that the exterior coil 38 be helically wound while keeping each turn of the exterior coil 38 in absolute contact with adjacent turns. Although the exterior coil 38 is wound in a single layer as shown in FIG. 1 in the present embodiment, the exterior coil 38 may be wound in two or more overlapping layers. When the exterior coil 38 is set to function as an external electrode of the tubular fuel cell 100, the oxidant gas flowing outside the tubular fuel cell 100 can be supplied to the second catalytic layer 36.

The resin seal 40 is formed by a coating of non-conductive resin material, such as an epoxy resin. As shown in the sectional views of FIGS. 1 and 3, the resin seal 40 is formed covering an exposed region on each edge portion of the internal electrode 30 and end faces of the first catalytic layer 32, the electrolytic layer 34, and the second catalytic layer 36 in addition to an intersection between the exposed region and the end faces.

More specifically, the resin material is coated so as to cover at least the end faces of the first catalytic layer 32, the electrolytic layer 34, and the second catalytic layer 36 and the intersection between the internal electrode 30 and the first catalytic layer 32 while partially leaving the edge portion of the internal electrode 30 uncoated and exposed from the resin seal 40 at an extreme end. Preferably, the resin material is applied at a thickness greater than the outside diameter of the second catalytic layer 36 to provide the resin seal 40 which covers not only the end faces of the first catalytic layer 32, the electrolytic layer 34, and the second catalytic layer 36, but also a part of the outer circumferential wall of the second catalytic layer 36.

The resin seal 40 can prevent leakage of the fuel gas and the oxidant gas from occurring at an intersecting area between the exposed region on each edge portion of the internal electrode 30 and an end face of the lamination of the first catalytic layer 32, the electrolytic layer 34, and the second catalytic layer 36.

The spacer 42 is composed of a material having excellent electrical conductivity, and may be formed using a highly conductive material such as, for example, stainless steel, gold, silver, copper, aluminum, or the like. When a material such as stainless steel is used, the material is preferably coated or electroplated with a superior corrosion-proof material, such as gold or silver in order to enhance resistance to corrosion.

As shown in FIGS. 4A to 4D, the spacer 42 is formed in a shape of a cylinder, a rectangular column, a hexagonal column, or a triangular column having a hollow 42a formed as a through hole. The edge of the tubular fuel cell 100 is inserted into the hollow 42a formed as a through hole of the spacer 42, to have the spacer 42 attached thereto. Here, the spacer 42 is installed in a state where at least a part of the spacer 42 physically contacts the exterior coil 38.

Although in the example of the present embodiment the first catalytic layer 32, the electrolytic layer 34, and the second catalytic layer 36 are laminated on the outer surface of the cylindrical internal electrode 30, to thereby constitute a tubular fuel cell 100 having the shape of a cylindrical column, the shape of the tubular fuel cell 100 is not limited to a cylindrical column shape. The first catalytic layer 32, the electrolytic layer 34, and the second catalytic layer 36 may be laminated on the outer surface of the internal electrode 30 formed in a shape of a hollow polygonal column, to thereby constitute a tubular fuel cell 100 having a polygonal cross section.

Fuel Cell Module

Figure 5:
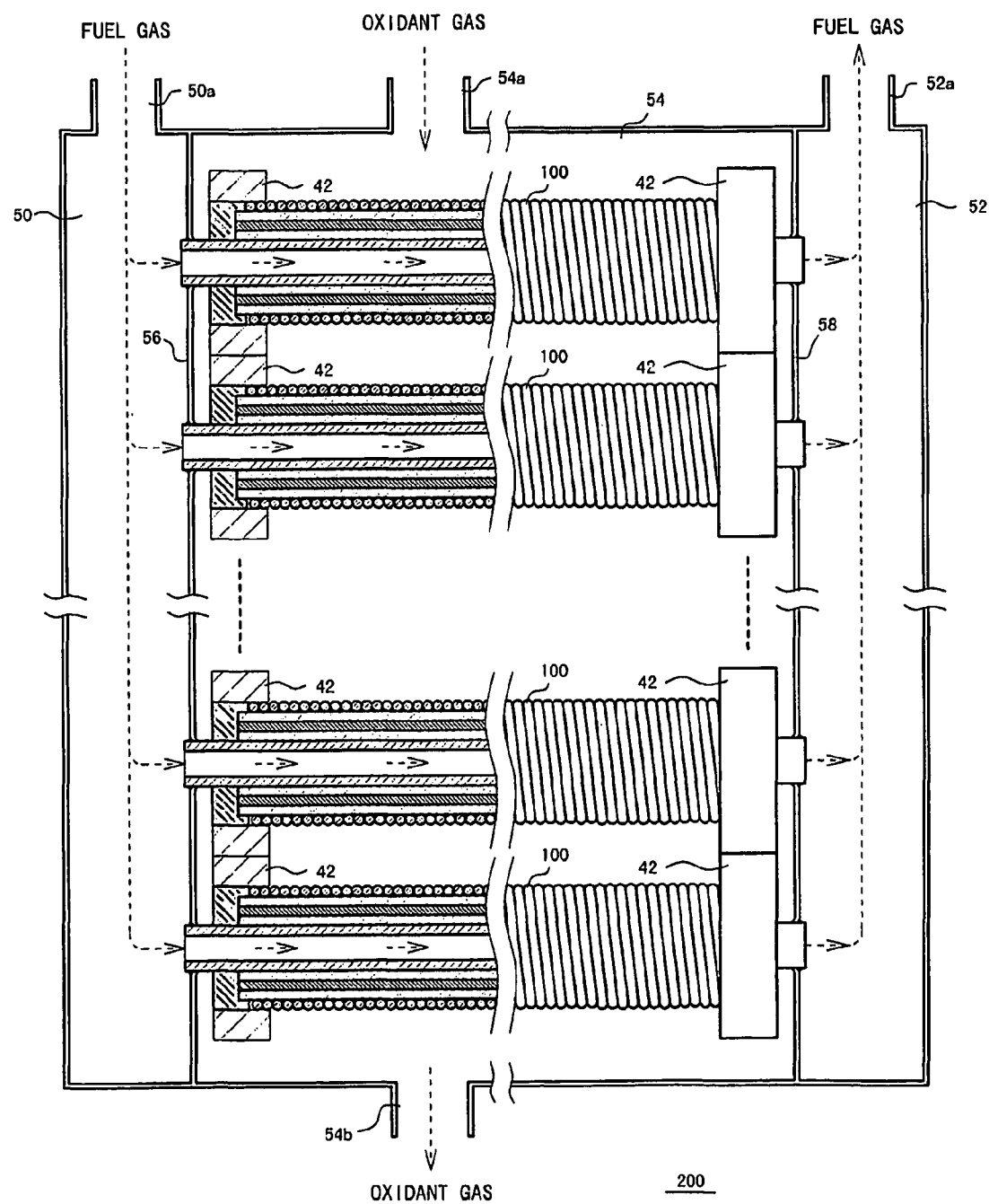
FIG. 5 shows, in a cross sectional view, a structure of a fuel cell module according to an embodiment of the present invention.

Next, an example structure in which the tubular fuel cells 100 are combined into a module according to the present embodiment will be described below. FIG. 5 shows, in a cross sectional view, the structure of a fuel cell module 200 in which the tubular fuel cells 100 are integrated. In FIG. 5, a left half of the tubular fuel cell 100 is shown in a sectional drawing, and a right half of the tubular fuel cell 100 is shown in an outline drawing for simplifying the description.

The fuel cell module 200 comprises a plurality of tubular fuel cells 100, a fuel gas feed chamber 50, a fuel gas discharge chamber 52, and an oxidant chamber 54. The oxidant chamber 54 is isolated from the fuel gas feed chamber 50 and from the fuel gas discharge chamber 52 by a feeding side sealing section 56 and a discharging side sealing section 58, respectively. The feeding side sealing section 56 and the discharging side sealing section 58 provide sealing in an area outside the resin seal 40 mounted on the edge portion of the tubular fuel cell 100, to prevent gas leaks from occurring between the oxidant chamber 54 and the fuel gas feed chamber 50 and between the oxidant chamber 54 and the fuel gas discharge chamber 52. In other words, the power generating section of the tubular fuel cell 100 is placed in the oxidant chamber 54, allowing the fuel gas feed chamber 50 to communicate with the fuel gas discharge chamber 52 via the hollow of the internal electrode 30.

The oxidant chamber 54 has an oxidant gas feeding port 54a and an oxidant gas discharging port 54b formed thereon to feed oxidant gas in from the outside and discharge the oxidant gas to the outside. On the other hand, the fuel gas feed chamber 50 has a fuel gas feeding port 50a for supplying the fuel gas to each tubular fuel cell 100, while the fuel gas discharge chamber 52 has a fuel gas discharging port 52a for discharging the fuel gas from each tubular fuel cell 100.

When the tubular fuel cells 100 are combined into the module, the tubular fuel cells 100 are stacked in a state where the outer circumferential surfaces of the spacers 42 contact with each other. Here, the spacers 42 are defined to be of an outside diameter a which is greater than an outside diameter b of the exterior coil 38 wound around the outer circumferential surface of the second catalytic layer 36 (when the spacer 42 has a polygonal column shape, a distance from the center of the spacer 42 to each side of the spacer 42 is defined as the outside diameter a). When the spacers 42 are formed with the outside diameter a of a desired value under the above-described condition, the plurality of tubular fuel cells 100 can be integrated at predetermined spacings maintained by the spacers 42.

For example, each of the tubular fuel cells 100 may be formed with an outside diameter measuring several millimeters to several centimeters at a portion other than the spacer 42 and with a length measuring in tens to hundreds of millimeters. In such a case, when a spacer 42 having a radius of 1 mm is attached to each of the tubular fuel cells 100 having a diameter of 1 millimeter, the tubular fuel cells 100 can be combined into the module while maintaining an approximately 2 mm spacing between adjacent tubular fuel cells 100.

In the fuel cell module according to the present embodiment, the tubular fuel cells 100 can be supported by the spacers 42 mounted on each edge portion of the tubular fuel cells 200 as described above.

In addition, because the spacers 42 mounted on each tubular fuel cell 100 are composed of a conductive material, and installed so as to electrically contact with the exterior coils 38, the exterior coils 38 of the tubular fuel cells 100 can be electrically connected in parallel concurrently only by integrating a plurality of the tubular fuel cells 100.

On the other hand, the internal electrodes 30 of the tubular fuel cells 100 are connected in parallel with each other using an external wire. The internal electrodes 30 and the spacers 42 individually connected in parallel are linked with each other through an external circuit. Alternatively, different spacers electrically isolated from the spacers 42 which are electrically conducting to the exterior coil 38 may be additionally mounted on the edge portions of the internal electrodes 30. By defining the outside diameter of the different spacers to be equal to that of the spacers 42, the internal electrodes 30 can also be connected in parallel at the same time.

The spacers which also function as current collecting electrodes are used as described above, thereby maintaining a fixed distance between the tubular fuel cells, while enabling electrical connection between the tubular fuel cells at the same time. In this manner, the fuel cell module can be manufactured in an easy and inexpensive way. Especially when the tubular fuel cells measuring several millimeters to several centimeters in diameter are combined into a module, a burdensome task of separately installing wiring for current collection independently of the spacers can be eliminated.

Although FIG. 5 shows the structure in which the tubular fuel cells 100 are stacked in a direction parallel to a sheet face of the drawing, the tubular fuel cells 100 may be stacked along a direction perpendicular to the sheet face of the drawing. In addition, the fuel cell module 200 may be used as one of sub modules connected in series or in parallel to constitute a larger superior module.

Action of Fuel Cell Module

Next, actions of the fuel cell module 200 will be described. During operation of the fuel cells, fuel gas is supplied from the fuel gas feeding port 50a via the fuel gas feed chamber 50 to each internal electrode 30 of the tubular fuel cells 100. Concurrently, oxidant gas is supplied from the oxidant gas feeding port 54a to the oxidant chamber 54. The fuel gas and the oxidant gas flow through the fuel cell module 200 while being prevented by the feeding side sealing section 56 and the discharging side sealing section 58 from mixing with each other.

The fuel gas passes through the hollow sections of the internal electrodes 30, and is then supplied through the pores formed on the circumferential walls of the internal electrodes 30 to the first catalyst layers 32. The fuel gas is oxidized in the electrolytic layers 34 adjoining to the first catalytic layers 32, thereby releasing electrons. On the other hand, the oxidant gas is supplied through interstices between the turns of the exterior coils 38 to the second catalytic layers 36. As the electrons are supplied from the internal electrodes 30 through the external circuit to the exterior coils 38, the oxidant gas is oxidized while consuming the electrons. In this reaction, electric power is drawn out to the external circuit.

The fuel gas which has undergone reaction and remaining unreacted fuel gas are ejected from the fuel gas discharge chamber 52 through the fuel gas discharging port 52b. On the other hand, the oxidant gas having undergone the reaction and unreacted oxidant gas are ejected from the oxidant gas discharging port 54b.

Although the first catalytic layers 32 are defined as the fuel electrodes and the second catalytic layers 36 are defined as the air electrodes in the present embodiment, it is also possible to define the first catalytic layers 32 as the air electrodes and the second catalytic layers 36 as the fuel electrodes. In this case, the power generating reaction can be created in a similar way by interchanging supply paths between the fuel gas and the oxidant gas.

Example Modification

Figure 6:
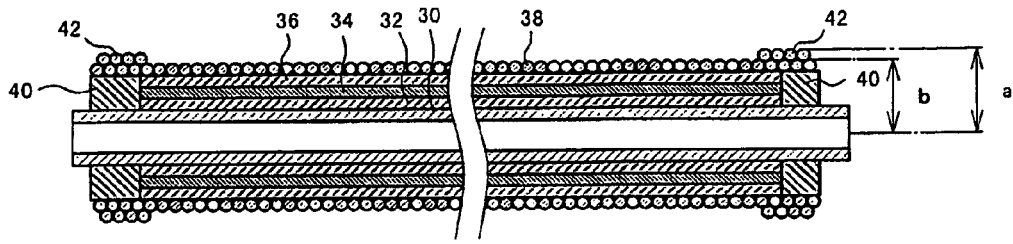
FIG. 6 shows, in a cross sectional view, a modification example of the tubular fuel cell according to an embodiment of the present invention.
Figure 7:
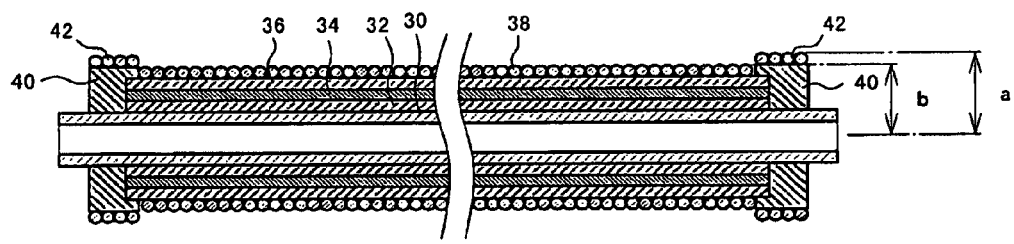
FIG. 7 shows, in a cross sectional view, another modification example of the tubular fuel cell according to an embodiment of the present invention.
Figure 8:
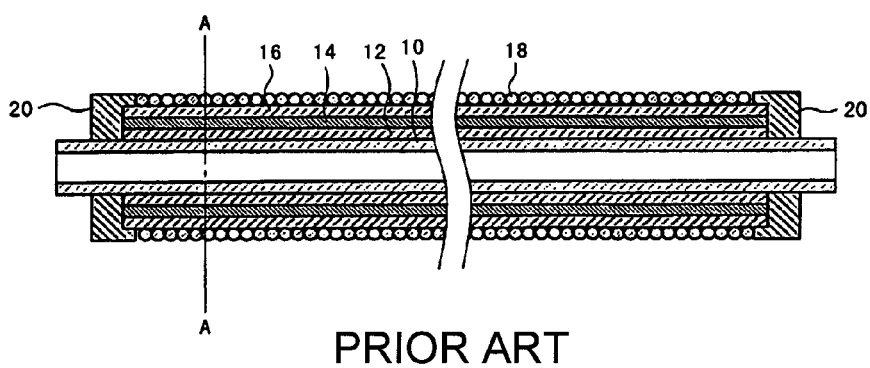
FIG. 8 shows, in a cross sectional view, a structure of a conventional tubular fuel cell.
Figure 9:
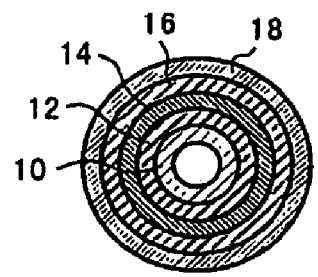
FIG. 9 is a cross sectional view taken along a line A-A in FIG. 8 showing the structure of the conventional tubular fuel cell.

FIGS. 6 and 7 show, in cross sectional view, tubular fuel cells 102 and 104 according to modified examples of the present embodiment. In the modified examples, a part of the exterior coil 38 is wound so as to have an outside diameter a greater than the outside diameter b of the other part of the exterior coil 38 wound around the outer circumferential surface of the second catalytic layer 36, thereby defining the part of the exterior coil 38 as the spacer 42. For example, as shown in FIGS. 6 and 7, each end of the exterior coil 38 wound around the outer circumferential surface of the second catalytic layer 36 may be extended and wound around the outer circumferential surface of the resin seal 40, to configure the end of the exterior coil 38 as the spacer 42.

Here, in a case where the outside diameter of the resin seal 40 is equal to that of the second catalytic layer 36 as shown in FIG. 6, when the exterior coil 38 is wound around the outer circumferential surface of the second catalytic layer 36 in n layer(s) (n=1 in FIG. 6), it is preferable that the spacer 42 is configured by winding the coil in at least (n+1) layers (two layers in FIG. 6) around the outer circumferential surface of the resin seal 40.

On the other hand, in a case where the outside diameter of the resin seal 40 is larger than that of the second catalytic layer 36 as shown in FIG. 7, assuming that the exterior coil 38 is wound around the outer circumferential surface of the second catalytic layer 36 in n layer(s) (n=1 in FIG. 7), it is preferable that the spacer 42 be configured by winding the coil in at least n layer(s) (one layer in FIG. 7) around the outer circumferential surface of the resin seal 40.

The number of layers of the coil may, of course, be increased in consideration of a required magnitude of spacing between the tubular fuel cells 102 when the tubular fuel cells 102 are combined into the module.

As described above, because a part of the exterior coil 38 is used as the spacer 42 and also functions as the current collecting electrode, concurrent implementation of combining the tubular fuel cells into the module at a distance secured between the tubular fuel cells and electrically connecting the tubular fuel cells is made possible. In particular, the partial use of the exterior coil 38 as the spacer 42 allows the formation of the spacer 42 to be performed also in the process of winding the coil, which can lead to easy and inexpensive manufacturing of the fuel cell module.

As such, according to the above-described example modifications of the embodiment, it is possible to provide a spacer which also functions as a collecting electrode, which can yield the ability to manufacture the fuel cell module in an easy and inexpensive manner. In particular, it becomes possible to establish electrical parallel connection between the cells simultaneously while securing substantially fixed spacings between the cells merely by aligning and bonding a plurality of the tubular fuel cells. Further, because the spacer is also used as the collecting electrode, the size of the fuel cell modules can be reduced.

The invention claimed is:

1. A tubular fuel cell comprising:
   an electrically conductive cylindrical internal electrode;
   a lamination of a first catalytic layer, an electrolytic layer, and a second catalytic layer sequentially laminated on an outer circumferential surface of the internal electrode;
   an exterior coil helically wound around an outer circumferential surface of the second catalytic layer to form two adjacent loops, wherein outer surfaces of the loops are in direct contact with each other around the outer circumferential surface of the second catalytic layer; and
   at least one electrically conductive spacer having an outside diameter greater than that of the exterior coil,
   wherein the at least one spacer is an electrically conductive member formed in the shape of a hollow cylindrical or polygonal column.

2. A tubular fuel cell according to claim 1, wherein the at least one spacer is electrically connected to the exterior coil.

3. A fuel cell module comprising a plurality of tubular fuel cells according claim 2, wherein
   the plurality of tubular fuel cells are arranged such that outer circumferential surfaces of the at least one spacer of adjacent fuel cells are brought into contact with each other.

4. A fuel cell module comprising a plurality of tubular fuel cells according to claim 1, wherein
   the plurality of tubular fuel cells are arranged such that outer circumferential surfaces of the at least one spacer of adjacent fuel cells are brought into contact with each other.

5. A tubular fuel cell according to claim 1, wherein the at least one electrically conductive spacer comprises a first electrically conductive spacer and a second electrically conductive spacer, and
   wherein the first electrically conductive spacer is positioned at a first end of the exterior coil and the second electrically conductive spacer is positioned at a second end of the exterior coil, the second end being opposite the first end along a length of the exterior coil.

6. A tubular fuel cell according to claim 1, wherein the at least one electrically conductive spacer comprises a through hole configured to receive both the internal electrode and the exterior coil.

7. A tubular fuel cell according to claim 1, wherein the at least one electrically conductive spacer is formed in the shape of a polygonal column.

8. The tubular fuel cell according to claim 5, wherein the exterior coil covers an entirety of the outer circumferential surface of the second catalytic layer disposed between the first spacer and the second spacer.

9. The tubular fuel cell according to claim 1, wherein the first catalytic layer, the electrolytic layer, and the second catalytic layer are layered directly on the outer circumferential surface of the internal electrode, and wherein the exterior coil is in direct contact with the outer circumferential surface of the second catalytic layer.

* * * * *